No. 707,641. Patented Aug. 26, 1902.
J. ROSTOCHIL.
EDGING DEVICE.
(Application filed Mar. 30, 1901.)
(No Model.)

Witnesses
Edw. Barutt
J. H. Glendenning

Inventor
John Rostochil
by Arthur F. Durand
Atty

UNITED STATES PATENT OFFICE.

JOHN ROSTOCHIL, OF CHICAGO, ILLINOIS.

EDGING DEVICE.

SPECIFICATION forming part of Letters Patent No. 707,641, dated August 26, 1902.

Application filed March 30, 1901. Serial No. 53,685. (No model.)

*To all whom it may concern:*

Be it known that I, JOHN ROSTOCHIL, a citizen of the United States, residing at Chicago, in the county of Cook and State of Illinois, have invented a certain new and useful Improvement in Edging Devices, of which the following is a specification.

My invention relates to means for edging lumber.

The objects of my invention are the provision of a simple, effective, and easily-operated device for holding and moving a board across the table of an edging-saw, to permit quick and accurate adjustment of the board in place upon the table, to insure against displacement of the board, to make it unnecessary to move the board more than once across the table in order to secure a straight edge, to permit of considerable variation in the length of the boards without necessitating readjustments of the means for holding or gripping the boards, to permit of considerable variation in the thickness of the boards, to provide an edging device which is readily adjustable with respect to boards of different lengths, and to provide certain details and features of improvement tending to increase the general efficiency, and thereby render a device of this character satisfactory and serviceable.

To the foregoing and other useful ends the device may consist of a slide having dogs adapted and arranged to engage the ends of a board or piece of lumber. In accordance with the aim of the invention one of these dogs can be mounted for a sliding adjustment along one end portion of the slide, and the other dog can be pivoted to the opposite end of said slide. The purposes of the invention can be further attained by adapting the pivoted dog to engage the upper surface of the board and also by giving this dog the additional function of a handle or grip by which to move the slide. The nature and advantage of my invention will, however, hereinafter more fully appear.

Figure 1:
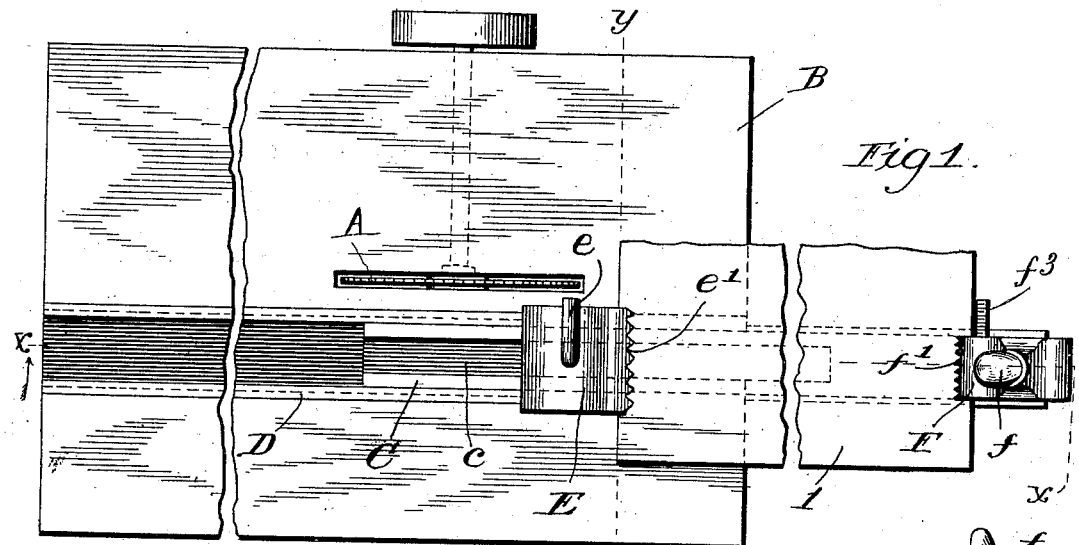
Figure 2:
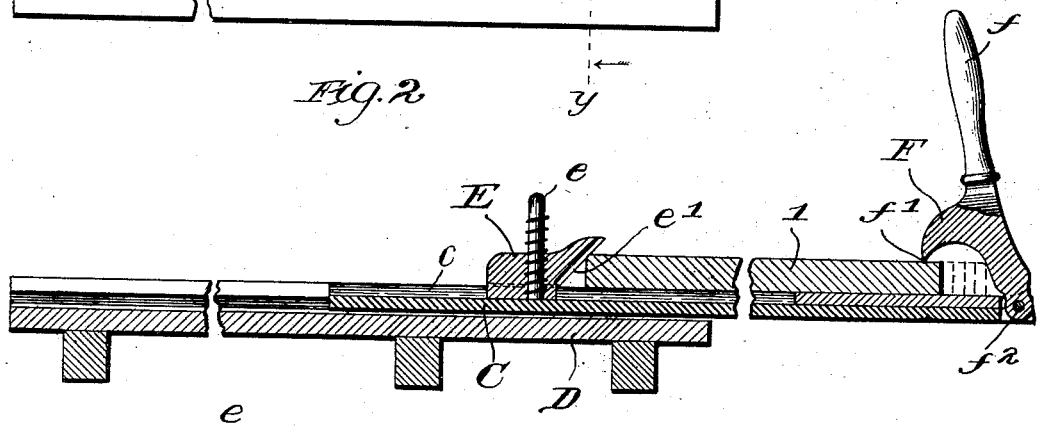
Figure 3:
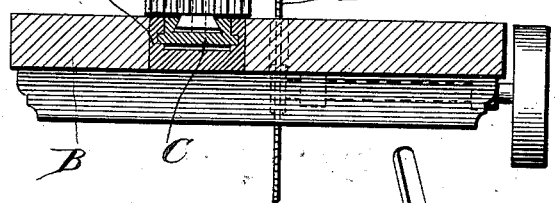
Figure 4:
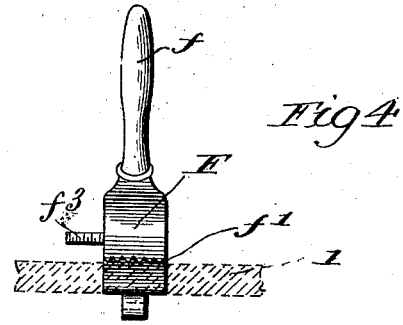
Figure 5:
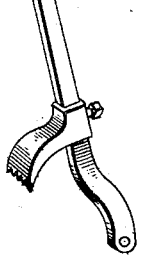

In the accompanying drawings, Figure 1 is a plan of a saw-table provided with an edging device constructed in accordance with my invention. Fig. 2 is a longitudinal section on line $x\,x$ in Fig. 1. Fig. 3 is a cross-section on line $y\,y$ in Fig. 1. Fig. 4 is a front view of the pivoted dog. Fig. 5 shows an adjustable dog.

It will be understood that the saw A and table B can be of any suitable or desired form and construction.

The slide C is preferably adapted to slide in a channel-iron D. This channel-iron can be sunk in a slot or groove in said table. Said slide is preferably somewhat longer than the lumber to be edged and is provided on its upper surface with a dovetail groove $c$, which extends from its forward end along the greater part of its length. The forward dog E is mounted for adjustment along the groove $c$, so as to accommodate boards of different lengths. A set-screw $e$ can be employed for locking or securing the dog at any point in said groove. This dog is preferably provided with an inclined or overhanging face $e'$, which is preferably formed with serrations or sharp ridges and which bites or holds the forward end of the board 1. The dog F is pivoted to the rear end of the slide. This pivoted dog is preferably formed with a handle $f$. The edge $f'$ of the pivoted dog may be provided with teeth, so as to enable it to more firmly and effectively engage the upper surface of the board. The pivotal point $f^2$ is preferably located in such manner that the weight of the hand will at all times hold the dog in firm contact with the board. In this way the dog is adapted to serve as a handle or grip by which to move the slide forward and back in its guideway. If desired, the dog can be adjustably mounted upon the handle or lever, as shown in Fig. 5. With this latter arrangement the dog can be readily adjusted with respect to different thicknesses of lumber. If desired, the dog can be provided with a gage $f^3$. It will be seen that the formation of the pivoted dog permits of considerable variation in the length of the boards without necessitating readjustment of the dog E.

Thus constructed the operation of my invention is as follows: The board 1 is adjusted in place as shown in Fig. 2, the operator grasping the handle $f$ with his left hand and the gage $f^3$ enabling him to readily determine the proper position for the board. When the board is properly adjusted in place, the operator moves the slide forward, so as to pass the saw through the edge of the board, or "edge it," as the operation is termed. In moving the slide forward the operator, as previously stated, grasps the handle *f*, and the weight of the hand keeps the dog F pressed firmly down upon the board. This is also true in drawing the slide back, as the formation or shape of the dog E and its handle is such that the backward pull on the handle can be accompanied by a downward pressure of sufficient force to prevent the dog from rising from the board. In this way both the gripping of the board and the movement of the slide are effected through the medium of a single device. Furthermore, the board is held firmly in place, whether the slide is advancing or moving back. If the saw is to be employed for purposes other than edging, the dog E is removed and the dog F thrown back and allowed to hang down, so as to be out of the way.

What I claim as my invention is—

1. A device for edging lumber, comprising a saw and saw-table, a slide arranged for forward-and-backward movement in a way extending alongside said saw, a dog or jaw mounted for sliding adjustment along the forward portion of said slide, a dog pivotally connected with the rear end of said slide and adapted to extend forward and engage the upper surface of the lumber, and an upwardly-extending handle rigid with said pivoted dog and adapted to afford a grip for moving the slide in both directions without releasing the lumber, substantially as described.

2. A saw-slide, a dog slidably mounted upon said slide, a rear pivoted dog adapted to engage the upper surface of the lumber, an upwardly-extending handle rigid with said pivoted dog, the pivot of the latter being located back of a line extending lengthwise through said handle, so that when force is exerted upon the handle for moving the slide back and forth it will be imparted downwardly to the pivoted dog and hold same in engagement with the lumber substantially as described.

3. A saw, a slide, an upright handle pivoted to the rear end of said slide, a dog slidingly mounted upon said handle and provided with means for rendering it rigid with said handle.

4. A saw, a slide, forwardly-adjustable dog, rear pivoted dog engaging the upper surface of the lumber, the pivoted dog being attached and so formed as to provide space between its engaging point or end and its pivot, so as to admit of variation in the length of lumber without necessitating readjustment of the forward dog, and an upwardly-projecting handle rigid with said pivoted dog and affording a grip for moving the slide back and forth, said handle extending in a line forward of the pivot for the jaw, so that when force is exerted upon the handle for moving the slide back and forth it will be imparted downwardly to the pivoted dog and hold same in engagement with the lumber, substantially as described.

5. In a lumber-edging device, a saw-table, a slide fitted in a way formed in the table, a jaw on the slide forming a member of the clamp, said jaw having an undercut edge facing the opposite member of the clamp and into which the ends of the boards are seated, a set-screw extending through the block and engaging the slide, a clamping-dog pivotally connected with the slide, said dog having an engaging edge formed therewith, a suitable distance forward of the pivot and a handle extending upwardly and forward of the pivot of said dog, whereby the force used in manipulating the slide can be utilized simultaneously to maintain the dog in engagement with the lumber, substantially as described.

6. In a lumber-edging device, a saw-table, a slide fitted in a way formed in the table, a jaw on the slide forming a member of a clamp, said jaw comprising a block having an undercut edge facing the opposite member of the clamp and into which the ends of the boards are seated, a screw run through the block and seated in the slide, a clamping-dog having its end pivoted to the slide, said dog having an engaging member formed therewith a distance from the pivot and a handle extending upwardly and forward of the pivot whereby the force used in manipulating the slide can be utilized simultaneously to maintain the dog in engagement with the lumber, substantially as described.

JOHN ROSTOCHIL.

Witnesses:
A. F. DURAND,
A. M. BELFIELD.